(12) United States Patent
Dence

(10) Patent No.: US 10,994,647 B1
(45) Date of Patent: May 4, 2021

(54) PIVOTING DEVICE FOR A CAMPER SHELL

(71) Applicant: Ralph Dence, Hemet, CA (US)

(72) Inventor: Ralph Dence, Hemet, CA (US)

(*) Notice: Subject to any disclaimer, the term of this patent is extended or adjusted under 35 U.S.C. 154(b) by 0 days.

(21) Appl. No.: 17/036,120

(22) Filed: Sep. 29, 2020

(51) Int. Cl.
| | | |
|---|---|---|
| *B60P 3/34* | (2006.01) | |
| *B60J 7/16* | (2006.01) | |
| *F16M 13/02* | (2006.01) | |
| *E05F 15/53* | (2015.01) | |
| *E05F 15/622* | (2015.01) | |

(52) U.S. Cl.
CPC .............. *B60P 3/34* (2013.01); *B60J 7/1621* (2013.01); *F16M 13/022* (2013.01); *E05F 15/53* (2015.01); *E05F 15/622* (2015.01)

(58) Field of Classification Search
CPC .................................. B60P 3/34; B60J 7/1621
USPC .................................... 296/164, 165, 100.06
See application file for complete search history.

(56) References Cited

U.S. PATENT DOCUMENTS

| | | | |
|---|---|---|---|
| 3,924,365 A | 12/1975 | Orberg | |
| 4,566,729 A | 1/1986 | Magnino | |
| 4,629,243 A | 12/1986 | Jensen | |
| 4,768,824 A * | 9/1988 | Andonian | B60P 3/34 296/105 |
| 4,819,981 A | 4/1989 | Moe et al. | |
| 4,948,311 A | 8/1990 | St. Pierre et al. | |
| 5,102,185 A | 4/1992 | Lake | |
| 5,353,826 A | 10/1994 | Davis, Sr. | |
| 5,403,061 A | 4/1995 | Micknowicz | |
| 5,558,392 A | 9/1996 | Young | |
| 5,595,418 A | 1/1997 | Medlin | |
| 5,704,681 A | 1/1998 | Lambden | |
| 5,951,095 A | 9/1999 | Herndon | |
| 6,007,137 A | 12/1999 | Lambden | |
| 6,086,134 A | 7/2000 | Cravens et al. | |
| 6,086,135 A * | 7/2000 | Bourgeois | B60J 7/1621 296/100.06 |
| 6,394,532 B1 | 5/2002 | Dence | |
| 6,749,249 B1 * | 6/2004 | Lang | B60J 7/1621 296/100.1 |

* cited by examiner

*Primary Examiner* — Joseph D. Pape
(74) *Attorney, Agent, or Firm* — Kirk A. Buhler; Buhler & Associates Patenting

(57) ABSTRACT

Improvements in a pivoting device for a camper shell on a truck, flat bed or utility bed that including a pair of support posts selectively coupled with respect to the forward and rearward ends of one of the opposed sides of the camper shell. The support posts each have a short lower section and a long upper section. The short lower sections have lower ends dimensioned for being received within the forward and rearward post holes of the bed. The long upper sections, extend upwardly at an inward angle from the short lower sections. The long upper sections each have an upper end securable to the camper shell for elevating the side of the camper shell above the bed. A pivot rod assembly is secured to each of the opposed side walls of the bed for selectively holding the camper shell to the side walls of the bed.

16 Claims, 10 Drawing Sheets

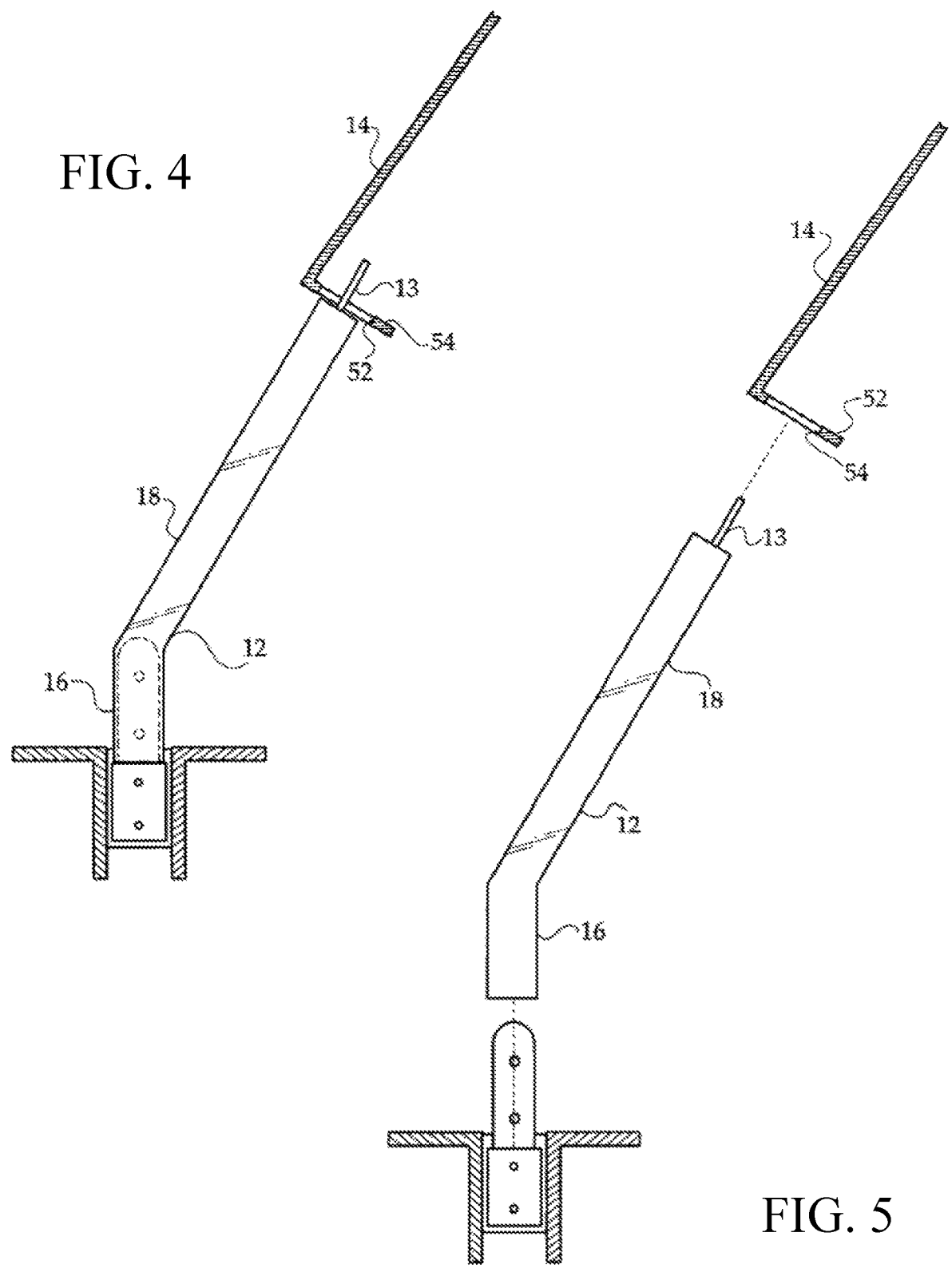

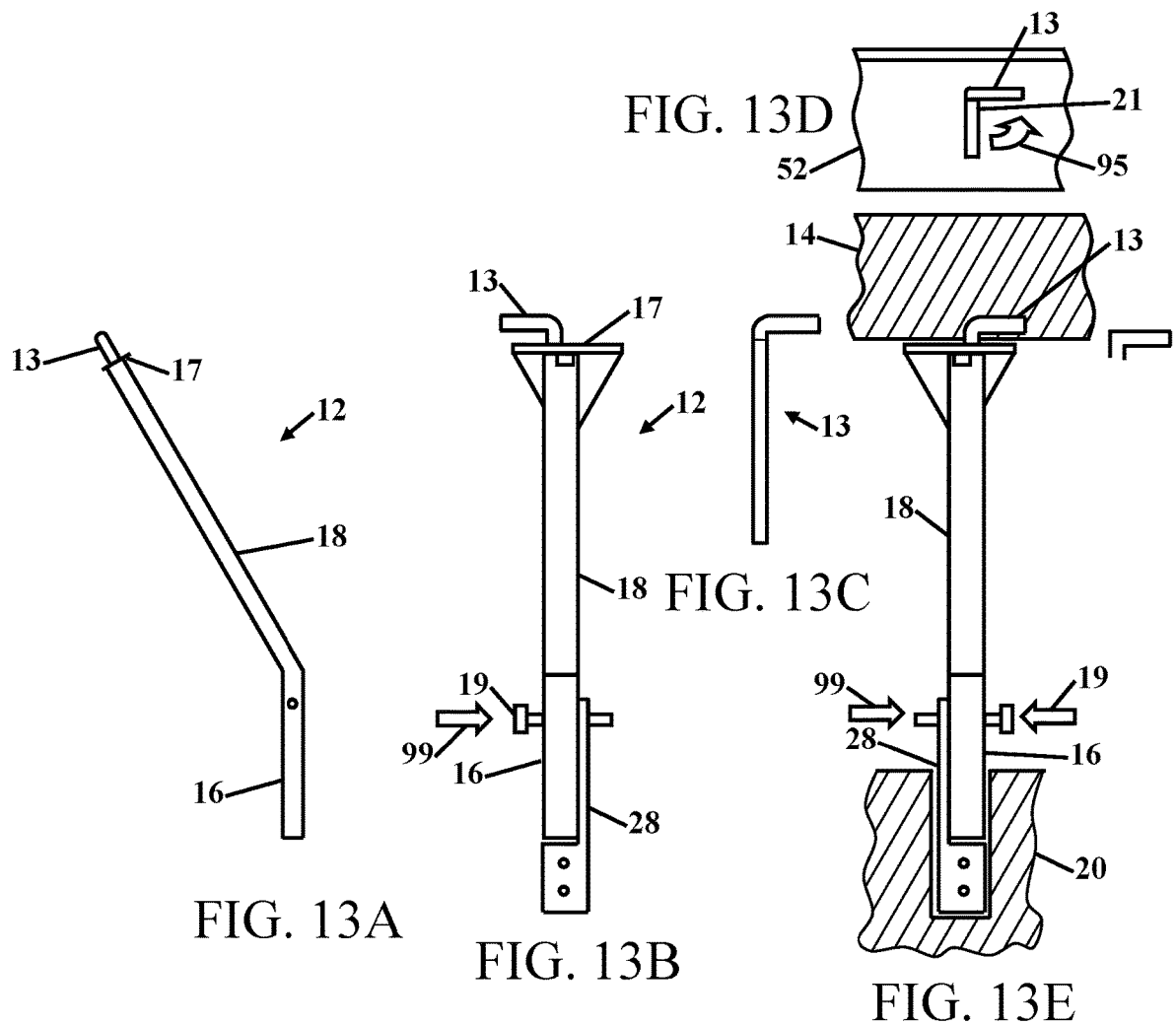
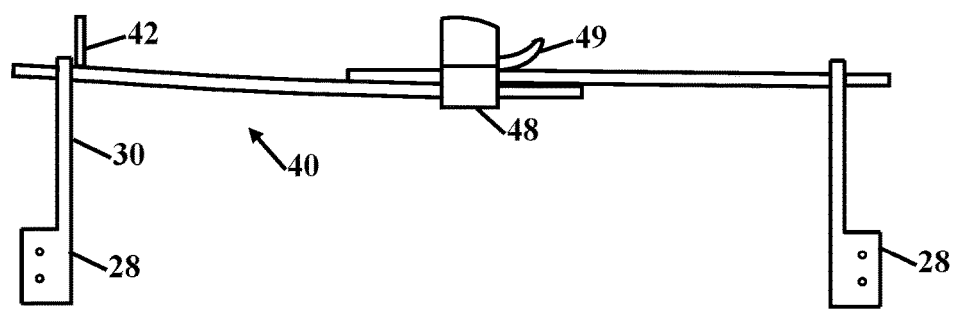

PIVOTING DEVICE FOR A CAMPER SHELL

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a pivoting device for a camper shell. More particularly, the present pivoting device for a camper shells allows for lifting one or the other side of a camper shell for easier access to the bed of the pick-up unlatch both sides to completely remove the camper shell from the truck.

Description of Related Art Including Information Disclosed Under 37 CFR 1.97 and 1.98

The present invention relates to a pivoting device for camper shells and more particularly pertains to allowing a camper shell to pivot upwardly on one side and remain in the upward position, for easy access to an interior of the pick-up truck bed.

The use of truck bed mounts is known in the prior art. More specifically, truck bed mounts heretofore devised and utilized for the purpose of protecting the contents of a truck bed are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,948,311 to St. Pierre discloses a tie down fitting for removably mounting within stake holds in a wall section of a pickup truck, to secure structures such as a tent. U.S. Pat. No. 3,924,365 to Orberg discloses means for attaching a curtain support shell to form a sleeping compartment for a vehicle. U.S. Pat. No. 4,566,729 to Magnito discloses a tent for a pickup truck with means to quickly construct the device. U.S. Pat. No. 5,353,826 to Davis, Sr. discloses a removable tent top attachable by a series of pins.

The inventors prior U.S. Pat. No. 6,394,532 discloses a pivoting device for a pick-up camper shell but had limited capability that is resolved in this disclosure. While these devices fulfill their respective, particular objective and requirements, the aforementioned patents do not describe a pivoting device for pick-up truck camper shells for allowing a camper shell to pivot upwardly for easy access to an interior of the pick-up truck bed.

What is needed is a new and improved pivoting device for pick-up truck camper shells which can be used for allowing a camper shell to pivot upwardly for easy access to an interior of the pick-up truck bed. In this regard, the present invention substantially fulfills this need.

BRIEF SUMMARY OF THE INVENTION

It is an object of the pivoting device for pick-up truck camper shells to provide an improved pivoting device for pick-up truck camper shells. As such, the general purpose of the present invention, which will be described subsequently in greater detail, is to provide a new and improved pivoting device for pick-up truck camper shells which has all the advantages of the prior art and none of the disadvantages.

It is another object of the pivoting device for pick-up truck camper shells to include a pair or four support posts removably coupled between the camper shell and one of the opposed sides of the truck bed. The support posts each have a short lower section and a long upper section. The short lower sections each have a lower end dimensioned for being received within the forward and rearward post holes of the truck bed. The long upper sections extend upwardly at an inward angle from the short lower sections. The long upper sections each have an upper end securable to the camper shell for elevating the side of the camper shell above the truck bed. A Chain or support post is secured between one of the side walls of the truck bed and one of the sides of the camper shell. A pivot rod assembly is secured at the side wall of the truck bed opposite the pair of support posts. The pivot rod assembly is comprised of a pivot rod having opposed ends, and a pair of vertical support brackets secured within posts holes in the side wall. The support brackets each have a tab extending vertically upward therefrom. Each tab has a pair of apertures for receiving the pivot rod. The pivot rod has a lever extending outwardly therefrom inwardly of one of the opposed ends thereof. The pivot rod assembly helps maintain the camper shell against the truck bed and selectively allows it to be raised therefrom.

It is another object of the pivoting device for pick-up truck camper shells to provide a new and improved pivoting device for pick-up truck camper shells which is susceptible of a low cost of manufacture with regard to both materials and labor, and which accordingly is then susceptible of low prices of sale to the consuming public, thereby making such a pivoting device for pick-up truck camper shells economically available to the buying public.

It is still another object of the pivoting device for pick-up truck camper shells to include a powered lift system that can lift one-side or the entire shell using pneumatics or hydraulics. This allows for access to the interior of the shell without requiring a user to lift the weight of some or all of the camper shell for allowing a camper shell to pivot upwardly for easy access to an interior of the pick-up truck bed. These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention. Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 4 is a cross sectional view, illustrating one of the support posts holding the camper shell in the upward position.

FIG. 5 is an assembly view, similar to FIG. 4, illustrating how the support post is positioned within one of the post holes, to hold the camper shell in the upward position.

Figure 6:
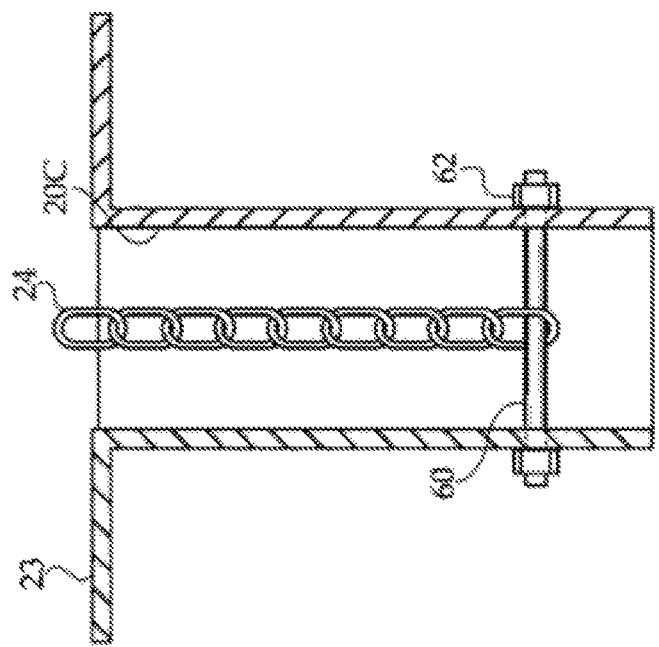

FIG. 6 is a cross sectional view, illustrating how one of the chains or strap(s) may be secured within one of the post holes. The L-hook, pull pin, straps in all four corners takes the place of the chain in the central area. This gives more freedom to load and unload from sides of the truck.

Figure 7:
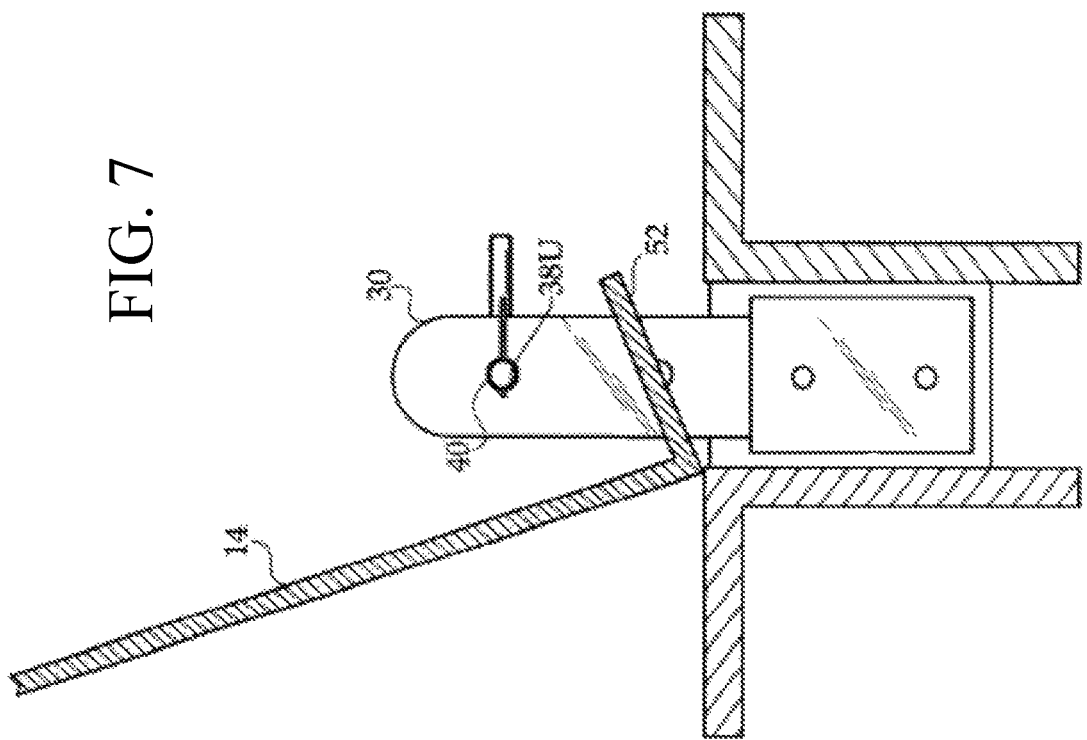

FIG. 7 is a cross sectional view, illustrating how the pivot rod is moved to the upper aperture in the tab of the support bracket, to prevent interference between the pivot rod and the lower flange of the camper shell.

Figure 8:
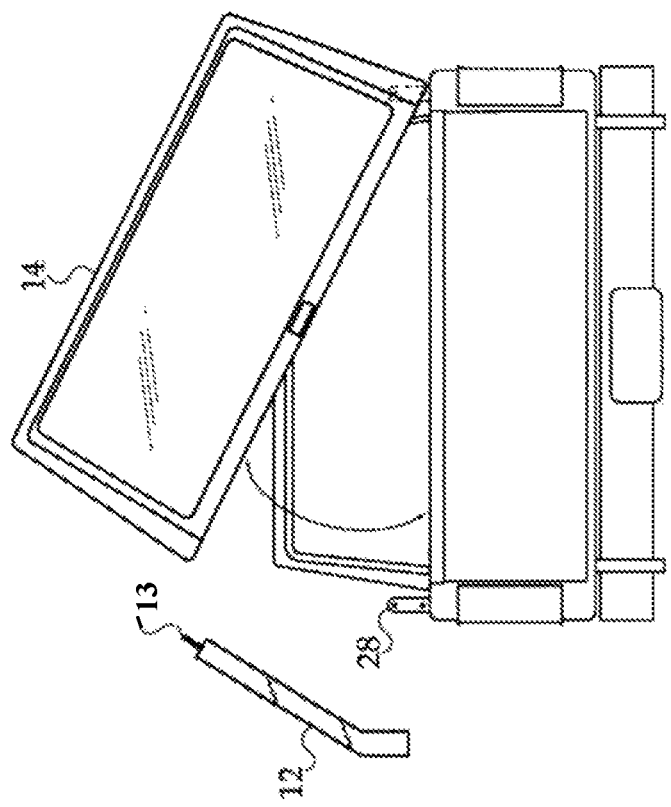

FIG. 8 is a rear elevational view, illustrating the camper shell pivoted into the upward position, wherein the support post is about to be used to hold the camper shell in the upward position.

Figure 9:
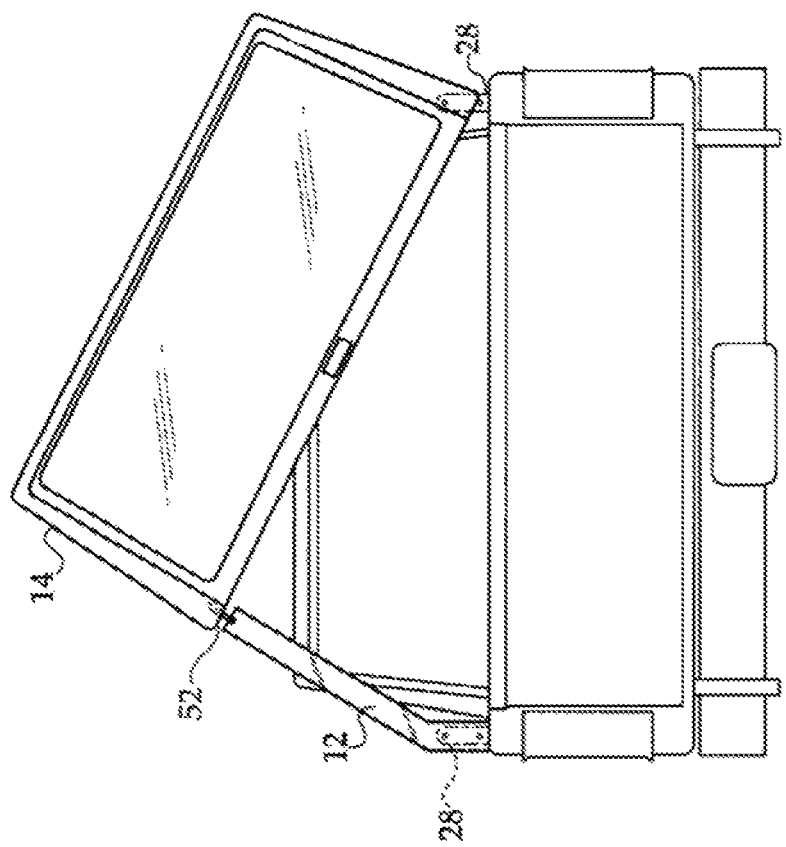

FIG. 9 is a rear elevational view, illustrating the camper shell held in the upward position by the support posts.

Figure 10:
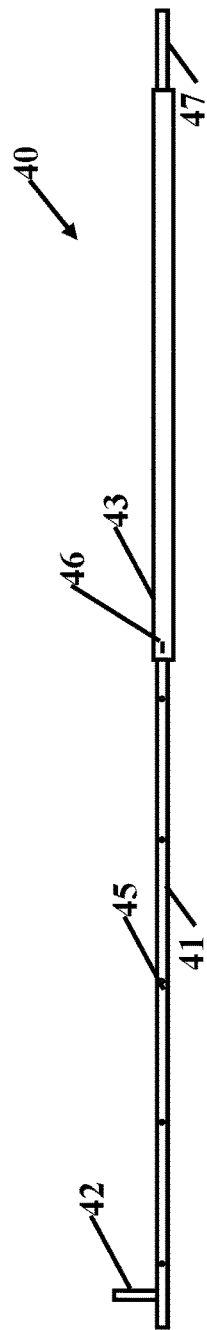

FIG. 10 shows a plan view of the pivot rod.

Figures 11A, 11B:
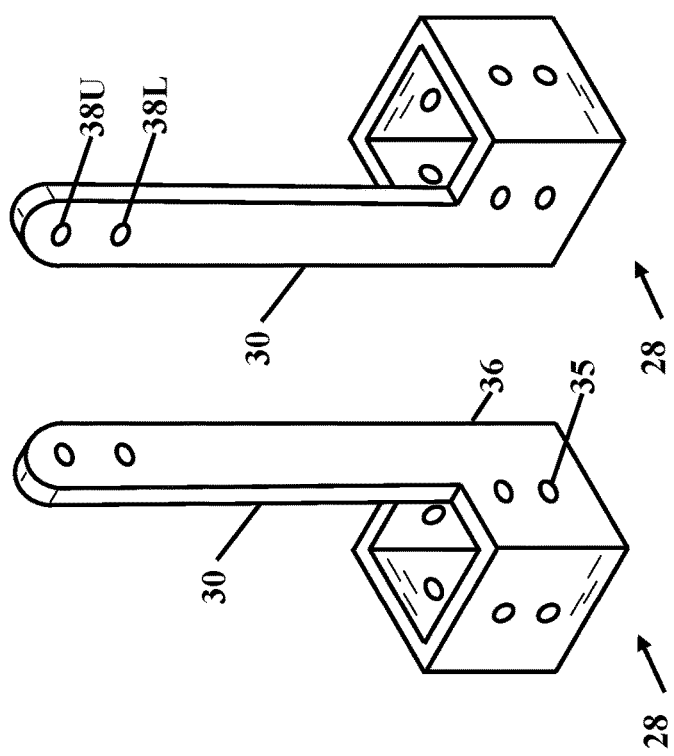

FIGS. 11A and 11B show perspective views of the right and left support brackets, respectively.

Figure 12:
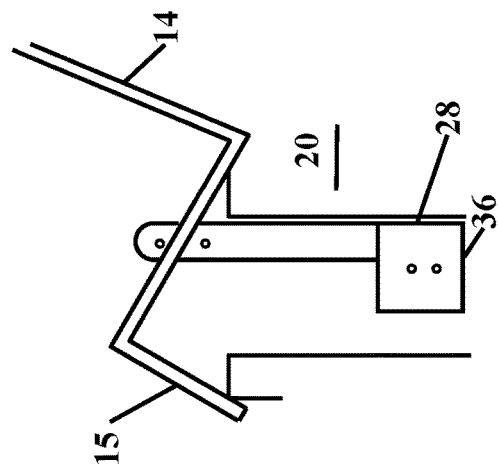

FIG. 12 shows a side view of the support bracket in the truck post hole with a camper shell.

FIG. 13A-13E show the support posts stand assembly.

FIG. 14 shows an optional latching device with support bracket risers.

FIG. 15A-15D show another preferred embodiment of the pivoting device for a pick-up truck with a hydraulic lifting mechanism.

Figure 16A:
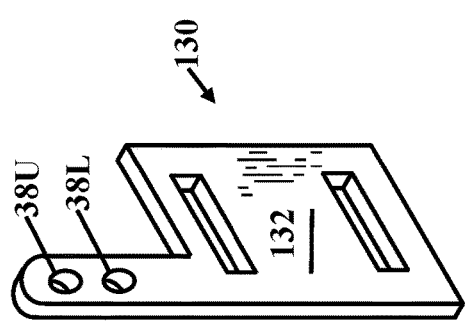
Figure 16B:
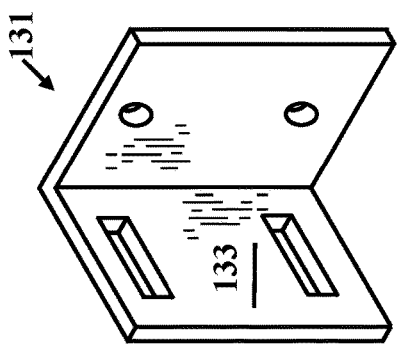

FIGS. 16A and 16B show an adjustable angle riser.

Figure 17B:
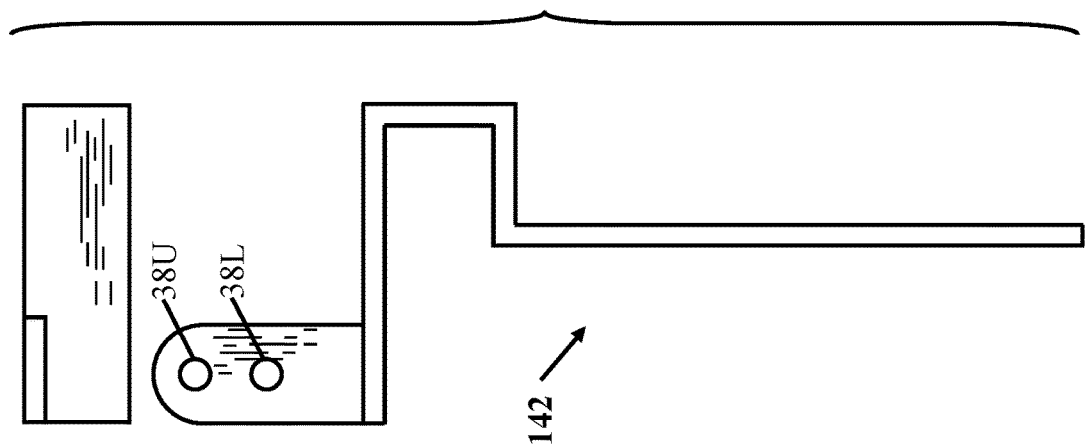
Figure 17A:
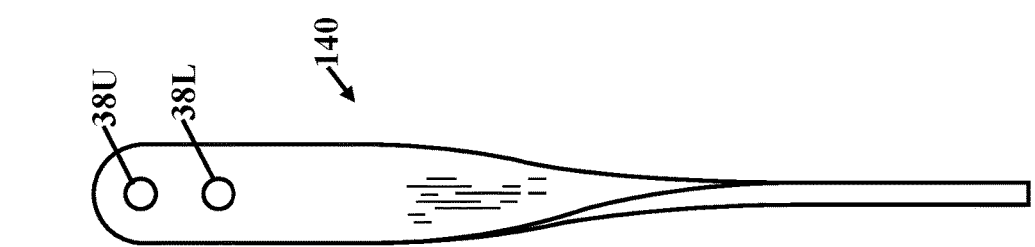

FIGS. 17A and 17B shows additional embodiments of the riser.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

Figure 1:
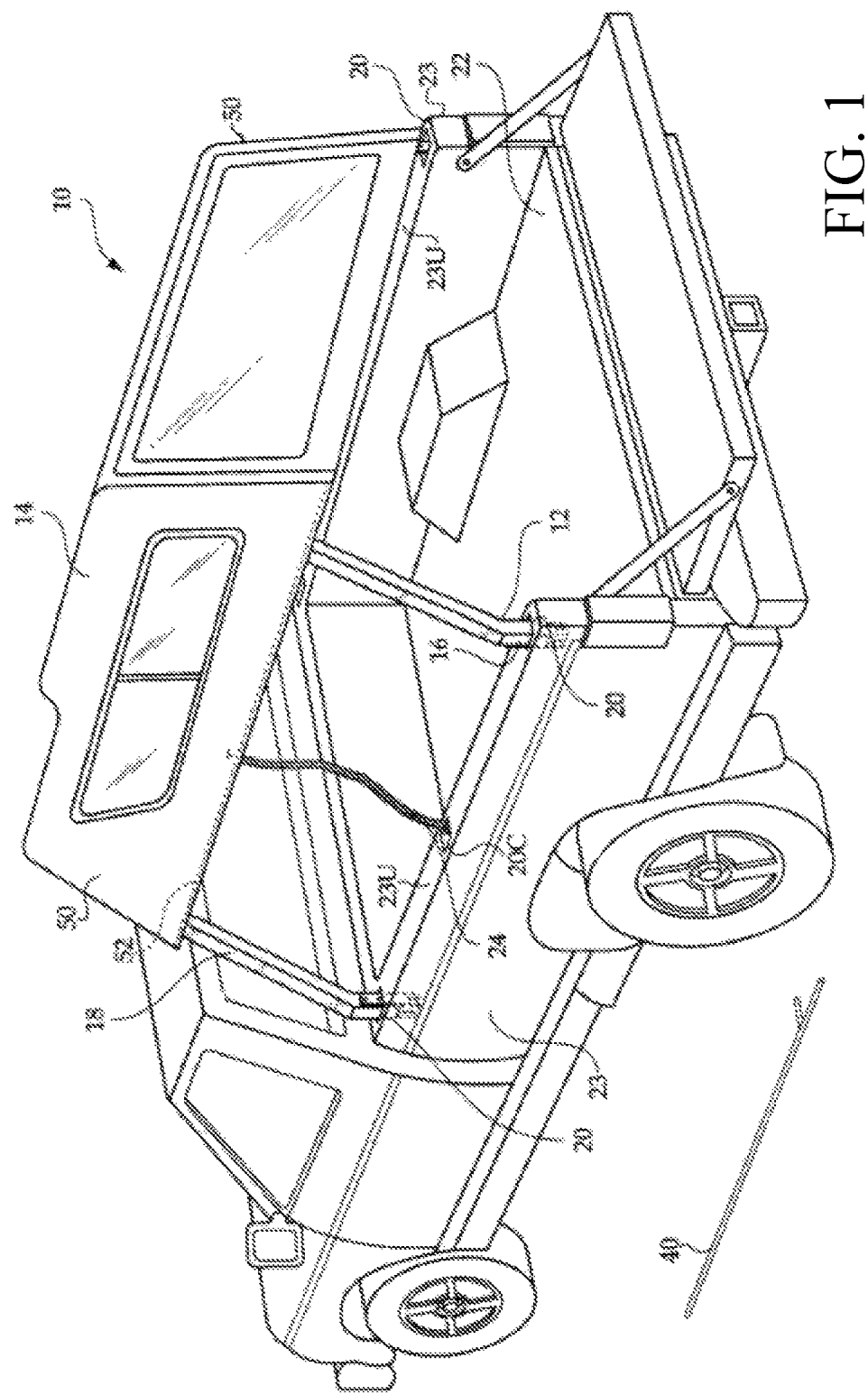
FIG. 1 shows a perspective view of a preferred embodiment for a pivoting device for pick-up truck camper shells constructed in accordance with the principles disclosed herein.

ITEM NUMBERS AND DESCRIPTION 10 pivoting device for camper shells
12 support posts
13 post pin
14 camper shell
15 camper shell flange
16 short lower section
17 saddle
18 upper section
19 pull pin
20 post holes
21 slot
22 truck bed
23 opposing side wall(s)
23U side upper surface
24 chain or strap
26 pivot rod assemblies
28 support bracket
29 bolt
30 tab
32 apertures
34 ends
35 mounting holes
36 lower end
38U upper aperture
38L lower aperture
39 hole
40 latching device
41 rod
42 lever
43 tube
44 cotter pin bore
45 holes
46 cotter pin
47 rod
48 cam lock
49 lever
50 pair of sides
52 lower flange
54 lower flange opening
60 bolt
62 nut
80 clamping device
81 bar
95 rotate
96 move
97 pull
98 adjustment
99 pulled
105 clamping device
110 shield
111 side flange
112 bottom flange
114 top opening
123 camper flange
130 adjustable riser A
131 adjustable riser B
132 tooth surface
133 smooth surface
140 twisted riser
142 warped riser FIG. 1 shows a perspective view of a preferred embodiment for a pivoting device for pick-up truck camper shells constructed in accordance with the principles disclosed herein. A pivoting device for pick-up truck camper shells for allowing a camper shell to selectively pivot upwardly along one of its opposed sides into an upward position, for easy access to an interior of the pick-up truck bed, and to be maintained in the upward position. In addition, the camper shell is also selectively held in the lowered position by the present invention. In its broadest context, the device consists of a pair of support posts, at least one chain, and a pivot rod assembly. Such components are individually configured and correlated with respect to each other so as to attain the desired objective.

The pivoting device for pick-up truck camper shells is used in conjunction with a truck bed 22, having a pair of longitudinally extending opposed sides 23, each having a side upper surface 23U. Several post holes 20 are located in the side upper surfaces 23U- and are generally positioned rearwardly, forwardly, and centered therebetween, as seen in FIG. 1. A camper shell 14 is dimensioned to extend across and cover the truck bed 22, and has a pair of sides 50, each having a lower flange 52.

According to the present pivoting device for pick-up truck camper shells the pair of support posts 12 are used to maintain the camper shell in the upward position. As such, the support posts 12 are selectively and removably coupled with respect to the forward and rearward ends of one of the opposed sides of the camper shell 14. The support posts 12 each have a short lower section 16 and a long upper section 18. The short lower sections 16 are dimensioned for being received within the forward and rearward post holes 20 of the truck bed 22. The long upper sections 18 extend upwardly at an inward angle from the short lower sections 16. The preferred angle is substantially twenty degrees. The long upper sections 18 each have an upper end securable to the camper shell 14 for elevating the side of the camper shell 14 above the truck bed 22. A post pin 13 extends axially upward from the upper section 18. In addition, as the lifted flange 52 has a lifted flange opening 54. The pin 13 extends through the lifted flange opening 54 and thereby prevents the camper shell from slipping off the upper section 18 of the support post 12. The pin can be a straight pin or can have an "L" bend. The "L" hooks 13 pull pins 19 and one strap in each corner. If the chain or strap 24 is eliminated there is more room for loading and unloading.

The flange 52 and the bed 22 would be connected at 4 corners with one strap at each corner. Each strap will have enough slack so the support post can be installed without adjusting the straps. The 4 straps decrease/raise the chance for the wind to take control of the camper shell 14 from being blown off of the truck bed 22 during windy conditions.

The pivot rod assemblies 26 are secured to the side walls 23 of the truck bed 22. The pivot rod assembly 26 fastens the lower flange 52 to the side upper surface 23U, yet allows one of the lower flanges 52 to be lifted in accordance with the invention. Accordingly, the pivot rod assembly includes a support bracket 28 and a latching device 40. The support brackets 28 are mounted in the post holes, such that each of the side walls 23 has two support brackets. The support brackets 28 each have a lower end 36 and an upper end 34, such that the lower end 36 is mounted within the post holes 20. Accordingly, the lower end 36 is a square cross-sectioned tube which is dimensioned to fit snugly within the post hole 20, and mounting holes 35 are provided to facilitate attachment of the lower end 36 to the post hole 20. In addition, the upper end 34 comprises a tab 30 extending vertically upward therefrom. Each tab 30 is substantially flat, and when the support bracket 28 is mounted in one of the post holes 20, said tab extends transverse to the truck bed 22. The tab 30 has a pair of apertures 38, including an upper aperture 38U and a lower aperture 38L. Among the two support brackets 28 mounted to each of the side walls 23, the upper apertures 38U are coaxially aligned with each other, and the lower apertures 38L are coaxially aligned with each other.

Figure 2:
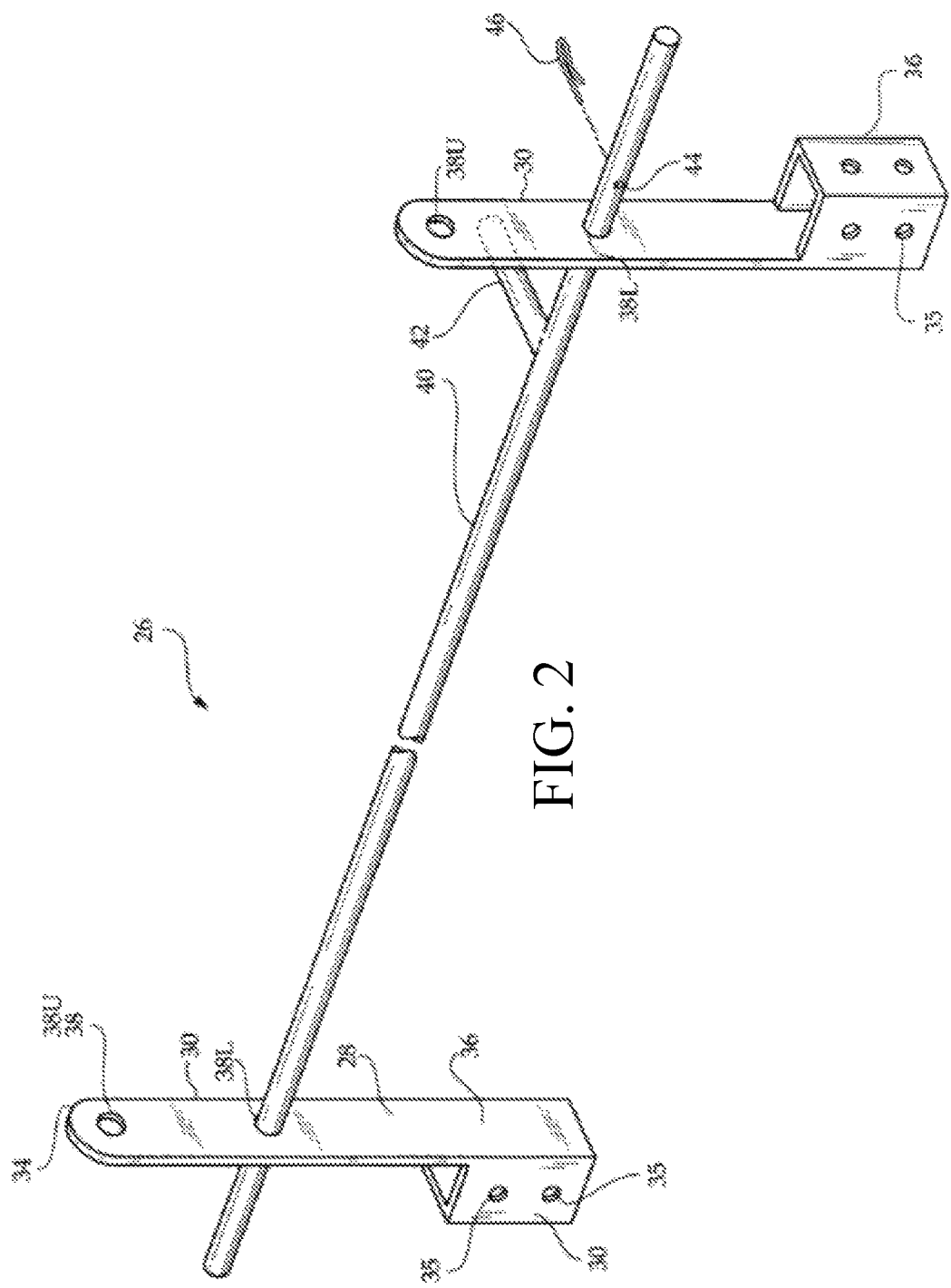
FIG. 2 is a perspective view of the pivot rod assembly of the present invention.

Once extended through apertures 32 in two of the support brackets 28 as seen in FIG. 2, the lever 42 prevents the latching device 40 from becoming accidentally removed from the support brackets 28 in one direction. The pivot rod assembly 26 includes a cotter pin 46, and the latching device 40 has a cotter pin bore 44, such that when the cotter pin 46 is in the cotter pin bore 44, the cotter pin 46 prevents the support rod 40 from sliding in one of the apertures 32 past said cotter pin 46. Accordingly, longitudinal movement of the latching device 40 is limited by the lever 42 on one side of the tab 30, and the cotter pin 46 on another side of the tab 30.

The latching device 40 has a lever 42 extending outwardly therefrom inwardly of one of the opposed ends thereof. Once extended through apertures 32 in two of the support brackets 28 as seen in FIG. 2, the lever 42 prevents the support rod 40 from becoming accidentally removed from the support brackets 28 in one direction. The pivot rod assembly 26 includes a cotter pin 46, and the latching device 40 has a cotter pin bore 44, such that when the cotter pin 46 is in the cotter pin bore 44, the cotter pin 46 prevents the latching device 40 from sliding in one of the apertures 32 past said cotter pin 46. Accordingly, longitudinal movement of the latching device 40 is limited by the lever 42 on one side of the tab 30, and the cotter pin 46 on another side of the tab 30.

Figure 3:
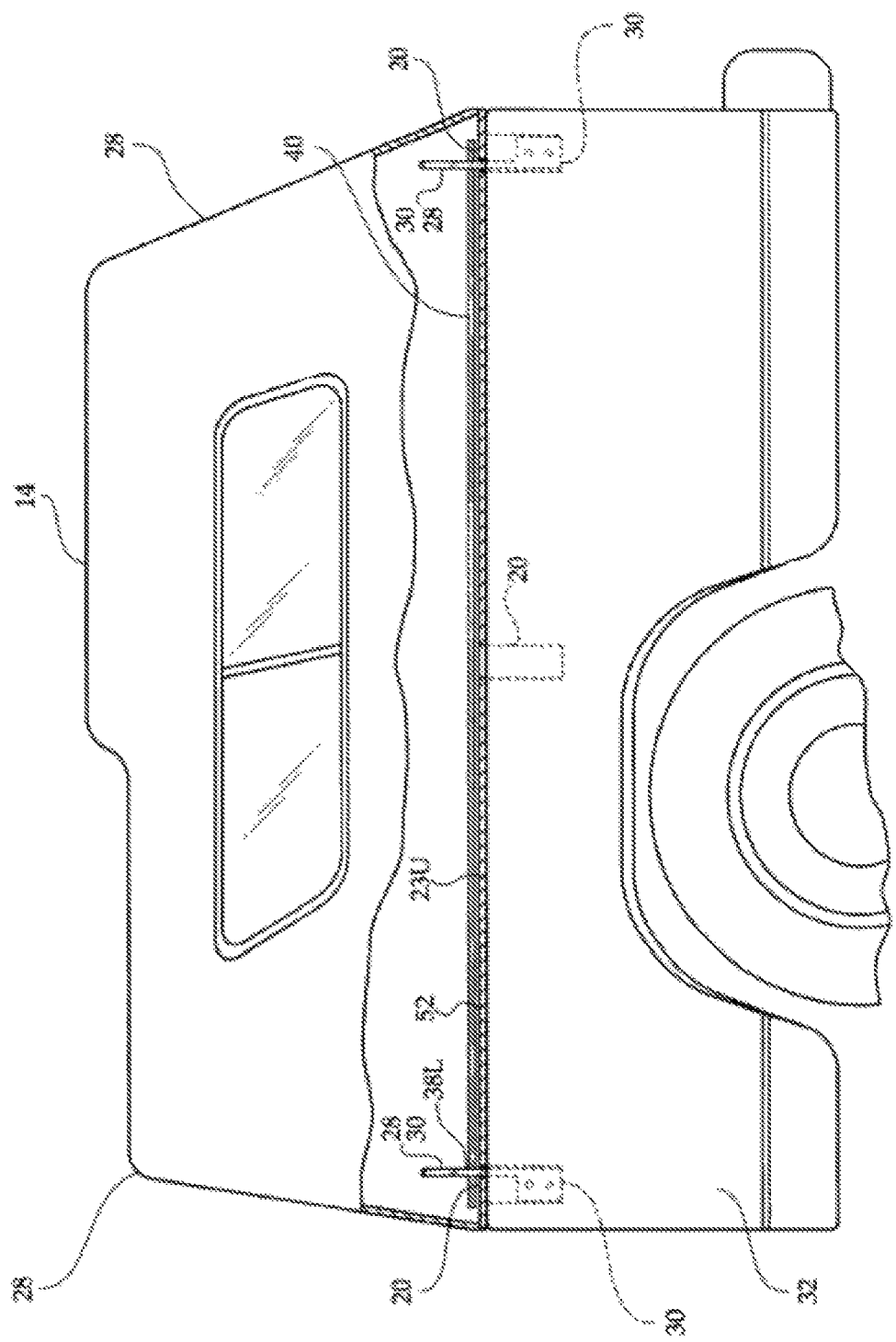
FIG. 3 is a side view of the present invention illustrating securement of camper shell to the truck bed sides using the pivot rod assembly.

Accordingly, during transport of the truck having the camper shell mounted thereon, the lower flanges 52 rest against the side upper surfaces 23U, with the tabs 30 extending through the lower flange openings 54 therein, as seen in FIG. 3. The latching device 40 extends through the lower apertures 38L, and thereby prevents the camper shell from detaching from the bed sides 23. The lever 42 and cotter pin 46 prevent the rod from inadvertently dislodging.

However, when it is desirable to pivot the camper shell upward, at the side to be lifted, the latching device 40 is removed from the tabs 30 on that side 23 of the truck bed to fully free the camper shell thereat. On the opposite side 23, it is still desirable to hold the camper shell 14 to the truck bed 22. However, the lower flange 52 thereat requires room to pivot, to avoid interfering with the lower flange 52. Accordingly, the latching device 40 is first moved to the upper apertures 38U in its associated support brackets 28, as seen in FIG. 7. Then, the camper shell 14 may be pivoted upward, as seen in FIGS. 7, 8, and 9.

It should be noted that the latching device 40 is shown as having arbitrary length. In general, its length is determined by the distance between post holes in the truck in which it is mounted. However, to make the latching device 40 universal between various truck types, the latching device 40 can be made telescoping in various ways, so that it can be adjusted to function with the post hole spacing of the truck with which it is used.

FIG. 10 shows a plan view of the latching device 40. The latching device 40 is an elongated bar which is capable of extending through the apertures 38 of the support brackets 28. The latching device 40 has a lever 42 that extends from the rod 41. The rod 40 is constructed with an outer tube 43 and rods 41 and 47 at opposing ends. A plurality of holes 45 allows is used with a cotter pin 46 to adjust the length of the latching device 40 to fit different size camper shells and truck beds.

FIGS. 11A and 11B show perspective views of the right and left support brackets 28, respectively. The right bracket 28 is shown in FIG. 11A and the left bracket is shown in FIG. 11B. Each bracket 28 has an open rectangular or square base in the lower end 36 that is configured to fit into a post hole in a side frame of a truck bed. The lower end 36 of each bracket 28 has a plurality of mounting holes 35. A tab 30 extends from the lower end 36. On each tab 30 has an upper aperture 38U and a lower aperture 38 that is configured to accept the rod 41 or 47 ends of the latching device 40.

FIG. 12 shows a side view of the support bracket 28 in the truck post hole 20 with a camper shell 14. In this figure a support bracket 28 is shown inserted into the post hole 20 of the bed of a pick-up truck with the lower end 36 of the support bracket 28 in the post hole 20. A segment of the camper shell 14 is shown with the flange of the camper shell 15. Washers, bolts and nuts secure the support bracket 28. This figure shows the right rear post hole 20 of the bed, but the configuration is similar in the remaining three post holes 20.

FIG. 13A-13E show the support posts 12 stand assembly. FIG. 13A is a side view of the support post 12 with an upper section 18 and a short lower section 16. The angle between the short lower section 16 and the upper section 18 is determined by how high the camper shell will be lifted/tilted from the bed sides of the truck bed. FIG. 13B is a front view of the support post 12 on the support bracket 28. The post pin 13 is an "L" hook that is supported on a saddle 17. In this figure a pull pin 19 with a pull spring passes through the short lower section 16 and into a hole in the support bracket 28. The post pin 13 is then rotated 95 to secure the camper shell 14 of the camper shell flange 15 to the upper section 18 and the pick-up truck. Once the L-hook is fitted to the flange of the camper shell the L-hook is prevented from turning in the saddle. When the post pin 13 is engaged into the camper shell flange 15 the support post 12 is rotated about 90 degrees so the pull pin 19 is withdrawn so the support post 12 is set into the pocket. The pull pin 19 is then released. The cylinder can then lift the camper shell.

In the preferred embodiment there is a total of 4 risers, with two risers on the right side and two risers on the left side. At the base of each riser is a rectangular tube. Each side of the tube has two vertically centered holes, for a total of 8 holes in the base. At the top of each riser is one plain. One pair of bolt holes of riser base would be used to bolt the riser to the post hole. The other holes of the riser base fits different post hole designs. The bottom hole at the top of each riser is for latching devices. When a camper shell is down and both sides of the camper shell is resting on the bed of the truck. The side of the camper shell. To lift the camper shell, the latching device is removed and set aside. The latching device of the camper shell side must remain down into the top holes of the riser front and rear camper shell. The flange connection to the camper shell can freely travel up and down on the risers. The slot length is determined by how high the camper shell is lifted.

The L-hook 13 point to the corner of the camper shell 14. Front L-hook points to the front. Rear points to the rear is adjusted to fit the flange of the camper shell. Then use a compound to hold the L-hook in the correct clock position. The adhesive force of the compound should be selected to allow for changing the camper shell so the L-hook can be used on a replacement camper shell, or the user can use binding type threads.

FIG. 13C is a side image of the post pin 13. FIG. 13E is a sectional view of the support post with the short lower section of the support post in the post hole of a truck side wall. FIG. 13D shows the lifted flange 52 of the camper shell supported on the saddle 17 on top of the upper section 18 of the support post 12. The post pin 13 secures the camper shell 14. FIG. 13D shows the post pin 13 passes through slot 21 and rotated to hold the camper shell 14 against the saddle 17. The "L" shaped post pin 13 can also be used in the embodiment shown in FIGS. 4 and 5. Pull pin 19 is pulled 99 to secure the support post 12 to the support bracket 28. While a pull pin 19 is shown and described it could also be a shoulder bolt or similar mechanism. The L-hook is to be pointed away from the riser. The L-hook is oriented to point to the front or the rear of the truck. The slot in the camper flange is positioned transverse left to right of the truck and the front of the L-hook.

A total of two stand assemblies are used in the front and rear stands. Each stand assembly consists of rectangular tubing that fits in the post hole with support bracket. The base of the riser will be located under the stand assembly. The size of the tubing of the stand is selected for a snug front-to-back fit within the post hole. The stand loosely fits left-to-right of the post hole. Therefore, the L-hook at the top of the stand can move left to right of the truck. This allows the L-hook to line-up with the slot. The L-hook is prevented from turning in the saddle, therefore, with the L-hook in the slot and then turned 90 degrees with the support post 12. The foot of the stand assembly can then be placed into the post hole. Same time pulling on the release pin, let go of the release pin. This is also performed on the other stand. The camper shell is fastened.

Two latching devices are used. One on the left side and one on the right side of the truck bed. The new design of the latching device allows for adjusting the latching device 40 from 4 feet-3 inches, up to eight feet to fit different lengths of truck beds. This also makes it easier for shipping. When manufacturing, the latching device 40 can be made to work as two support posts as well. This allows the latching device to serve a dual function—dual purpose.

FIG. 14 shows an optional latching device with support bracket 28 risers. In this embodiment the latching device 40 is constructed from two pieces on the support brackets 28. A cam lock 48 with a release lever 49 clamps the latching device 40 pieces. One of the two pieces is shown with the lever 42 that allows a user to push or pull on the latching device 40 in holes in the tab of the support bracket 28. The cam lever may optionally be a lock pin or cotter pin to fix the length of the latching device 40. The rods can have teeth spaced at pre-determined distances to lock the rods together with they are clamped.

Figure 15C:
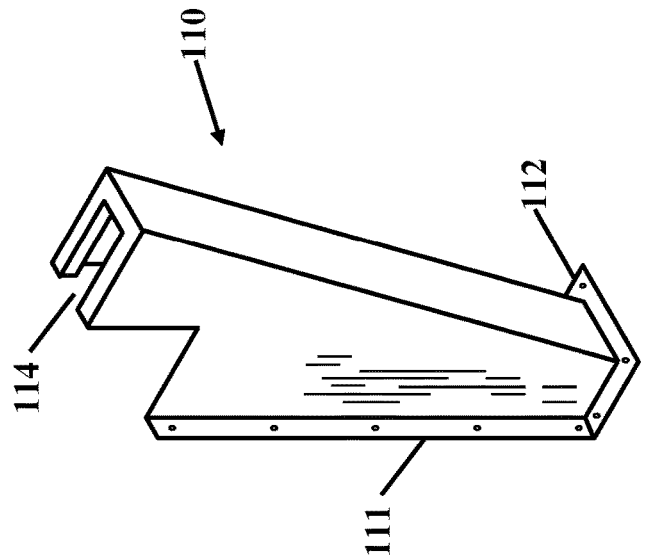
Figure 15D:
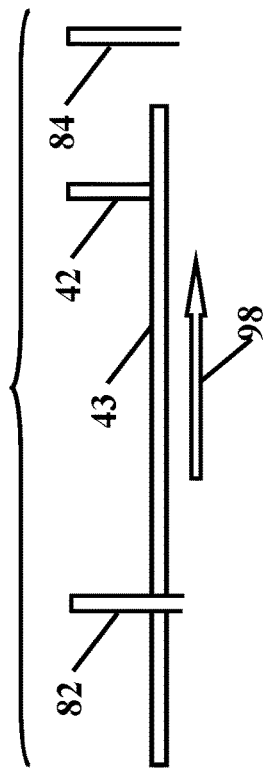
Figure 15B:
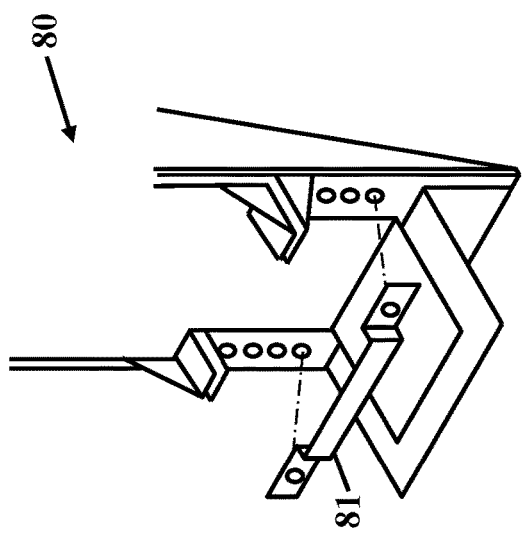
Figure 15A:
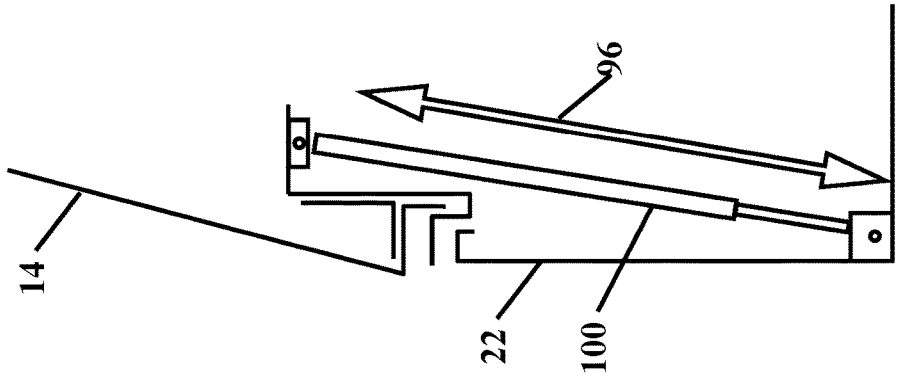

FIG. 15A-15D show another preferred embodiment of the pivoting device for a pick-up truck with a hydraulic lifting mechanism. The cylinder 100 can be operated by a mechanical or electrical worm drive, hydraulics or pneumatics. The lift is about 28 inches from the mounted position of the camper shell. The cylinder 100 moves 96 to lift and lower the camper shell 14. On the truck bed 22. One contemplated embodiment of a clamping device 80 is shown that allows the cylinder 100 to be secured to the camper shell. A bar 81 secures the components to the clamping device 80. The hydraulic or pneumatic lift is at least partially protected by a cylinder shield 110. The cylinder shield 110 has a bottom flange that is secured to the truck bed and side flanges 111 that secures the cylinder shield 110 to the side walls of a truck bed. A top opening 114 allows for clearance and movement of the piston or cylinder. In FIG. 15D the tube 43 is shown connected to the front riser 82. A user can adjust 98 the lever 42 to move the tube 43 into the rear riser 84 secure the camper shell (not shown).

FIGS. 16A and 16B show an adjustable angle riser. These risers are used with pick-up trucks that do not have pockets.

FIG. 16A is an adjustable riser A 130 with a tooth surface 132. The adjustable riser A 130 mates with the smooth surface 133 of the adjustable riser B 132. The parts can be flipped or mirror image to accommodate the four corners of the bed of the pick-up truck. FIGS. 17A and 17B shows additional embodiments of the riser. The twisted riser 140 in FIG. 17A can be bolted below the flange of the bed of a pick-up truck. The warped riser 17B is shown with the top view above and the plan view below. The configuration of the warped riser 17B can also be flipped, mirrored and adjusted to accommodate different size shape and configurations of pick-up truck beds. The bottom of both the twisted riser 140 and the warped riser can have holes to allow for mounting the risers to the inside wall of the bed of a pick-up truck.

Thus, specific embodiments of a pivoting device for pick-up truck camper shells have been disclosed. It should be apparent, however, to those skilled in the art that many more modifications besides those described are possible without departing from the inventive concepts herein. The inventive subject matter, therefore, is not to be restricted except in the spirit of the appended claims.

SEQUENCE LISTING

Not Applicable.

The invention claimed is:

1. A pivoting device for a camper shell comprising:
a vehicle having a bed;
the bed including a pair of longitudinally extending opposed side walls having side upper surfaces, the side walls each having a forward and rearward post hole, the camper shell having a forward end and a rearward end and camper shell sides, each camper shell side having a lifted flange;
a pair of support posts each having a short lower section and a long upper section, the short lower sections having lower ends dimensioned for being received within the forward and rearward post holes of the bed, the long upper sections extending upwardly at an inward angle from the short lower sections, the long upper sections each having an upper end having a post pin for extending through an aperture of one of the lifted flanges of the camper shell for elevating the side of the camper shell above the bed;
wherein said post pin is rotatable within said upper aperture of said lifted flange to secure said post pin in said upper flange;
a pair of pivot rod assemblies having an extendable length whereby said pair of pivot rod assemblies are adjustable to accommodate different distances between said forward and said rearward post hole;
each pivot rod assembly mountable along one of the sides of the bed, each pivot rod assembly having a pivot rod and a pair of support brackets, each support bracket having a lower end which is mountable within one of the post holes and an upper end having a tab which is capable of extending through an aperture of one of a lower flanges, each tab having an upper aperture and a lower aperture, the pivot rod that is configured for extending horizontally through apertures in the tabs of the support brackets located on the same side of the bed to prevent the camper shell from lifting from the bed sides until the rod is removed from the apertures.

2. The pivoting device for a camper shell according to claim 1, wherein the lower end of each of the support brackets is a square-cross sectioned tube, dimensioned to fit snugly within the post holes.

3. The pivoting device for a camper shell according to claim 1, further includes a safety strap secured between one of the bed side walls and one of the lifted flanges of the camper shell that prevents over rotation of the camper shell.

4. The pivoting device for a camper shell according to claim 1, further includes at least two worm drives that are configured to lift at least one side of said camper shell.

5. The pivoting device for a camper shell according to claim 4, wherein said at least two worm drives lift at least a left side, or a right side of said camper shell.

6. The pivoting device for a camper shell according to claim 1, further includes at least four worm drives that are configured to lift at least one side of said camper shell.

7. The pivoting device for a camper shell according to claim 1, further includes at least two pistons that are configured to lift at least one side of said camper shell.

8. The pivoting device for a camper shell according to claim 1, further includes at least four pistons that are configured to lift at least one side of said camper shell.

9. A pivoting device for a camper shell comprising:
a vehicle having a bed having a pair of side walls, each side wall having a side upper surface, each side wall having a forward and rearward post hole;
a camper shell having camper shell sides, each camper shell side having a lifted flange, each lifted flange having a pair of lifted flange openings;
a pair of support posts each having a short lower section and a long upper section, the short lower sections having lower ends dimensioned for being received within the forward and rearward post holes of the bed, the long upper sections extending upwardly at an inward angle from the short lower sections, the long upper sections each having an upper end having a post pin for extending through one of the lifted flange openings of the camper shell for elevating the side of the camper shell above the bed;
wherein said post pin is rotatable within said upper aperture of said lifted flange to secure said post pin in said upper flange;
a pair of pivot rod assemblies having an extendable length whereby said pair of pivot rod assemblies are adjustable to accommodate different distances between said forward and said rearward post hole;
each pivot rod assembly mounted along one of the sides of the bed, each pivot rod assembly having a pivot rod and a pair of support brackets, each support bracket having a lower end which is mounted within one of the post holes and an upper end having a tab which is capable of extending through one of a lower flanges, each tab having an upper aperture and a lower aperture, one of the support brackets is mounted in the forward post hole and the other of the support brackets mounted in the rearward post hole on its associated bed side such that the tabs of both of said support brackets are positioned so that the upper apertures in both said support brackets are coaxially aligned and the lower apertures in both said support brackets are coaxially aligned, the pivot rod selectively of extending horizontally through the lower apertures in the tabs of the support brackets to prevent the camper shell from lifting from the bed sides until the rod is removed from the apertures, the pivot rod also capable of being removed from the support brackets on one of the sides to allow that side to be lifted and capable of being removed to the upper apertures of the support brackets when the opposite of the bed sides is to be lifted.

10. The pivoting device for a camper shell according to claim 9, further includes a safety strap secured between one of the bed side walls and one of the lifted flanges of the camper shell that prevents over rotation of the camper shell.

11. The pivoting device for a camper shell according to claim 9, wherein the lower end of each of the support brackets is a square-cross sectioned tube, dimensioned to fit snugly within the post holes.

12. The pivoting device for a camper shell according to claim 9, further includes at least two worm drives that are configured to lift at least one side of said camper shell.

13. The pivoting device for a camper shell according to claim 12, wherein said at least two worm drives lift at least a left side, or a right side of said camper shell.

14. The pivoting device for a camper shell according to claim 9, further includes at least four worm drives that are configured to lift at least one side of said camper shell.

15. The pivoting device for a camper shell according to claim 9, further includes at least two pistons that are configured to lift at least one side of said camper shell.

16. The pivoting device for a camper shell according to claim 9, further includes at least four pistons that are configured to lift at least one side of said camper shell.

* * * * *